United States Patent [19]

Otsubo et al.

[11] Patent Number: 5,257,253
[45] Date of Patent: Oct. 26, 1993

[54] LASER VISION DISC WITH DIGITAL SOUND (LDD) DISC PLAYER FOR REPRODUCING ANALOG AUDIO SIGNALS MIXED WITH DIGITAL AUDIO SIGNALS

[75] Inventors: Hiroshi Otsubo; Seiji Ohmori; Tasuku Tsuruga; Eisaku Kawano; Takeshi Mawatari; Tetsuo Shimizu, all of Saitama, Japan

[73] Assignee: Pioneer Electronic Corporation, Tokyo, Japan

[21] Appl. No.: 994,077

[22] Filed: Dec. 17, 1992

Related U.S. Application Data

[63] Continuation of Ser. No. 481,272, Feb. 20, 1990, abandoned.

[30] Foreign Application Priority Data

Mar. 7, 1989 [JP] Japan ................. 1-54199

[51] Int. Cl.$^5$ .................................. G11B 7/00
[52] U.S. Cl. ......................... 369/48; 358/342; 360/27; 360/33.1; 369/58
[58] Field of Search ........... 358/335, 342; 360/27, 360/33.1; 369/32, 47, 48, 49, 50, 54, 58

[56] References Cited

U.S. PATENT DOCUMENTS

| | | | |
|---|---|---|---|
| 4,611,319 | 9/1986 | Naito | 369/47 |
| 4,698,695 | 10/1987 | Kosaka et al. | 358/342 X |
| 4,862,439 | 8/1989 | Ando et al. | 369/32 X |
| 4,885,644 | 12/1989 | Ishii et al. | 369/58 X |
| 5,008,872 | 4/1991 | Tomoda et al. | 369/32 |
| 5,056,075 | 10/1991 | Maruta et al. | 369/58 X |

FOREIGN PATENT DOCUMENTS 020294242 12/1988 European Pat. Off. .

OTHER PUBLICATIONS

Manual for Toshiba VCR Model V-S36, 1983.
Patent Abstracts of Japan, vol. 10, No. 308, (P-508) [2364], p. 26, dated Oct. 21, 1986, & JP 61-120374.
Patent Abstracts of Japan, vol. 12, No. 345, (P-759) [3192], p. 153, dated Sep. 16, 1988, & JP 63-103471.

*Primary Examiner*—W. R. Young
*Attorney, Agent, or Firm*—Sughrue, Mion, Zinn, Macpeak & Seas

[57] ABSTRACT

A first reproduction circuit reproduces a digital stereo audio signal from a signal which is read by means of a pickup from a disc loaded at a playback position, and a second reproduction circuit reproduces an analog audio signal from the signal read by the pickup. When the disc loaded at the playback position is identified as being a Laser vision Disc with Digital sound (LDD) disc, the stereo audio signal outputted from the first reproduction circuit is mixed with the analog audio signal outputted from the second reproduction circuit, such that a vocal portion of a reproduction can be reproduced together with an accompaniment portion of the reproduction, in a stereo mode.

10 Claims, 4 Drawing Sheets

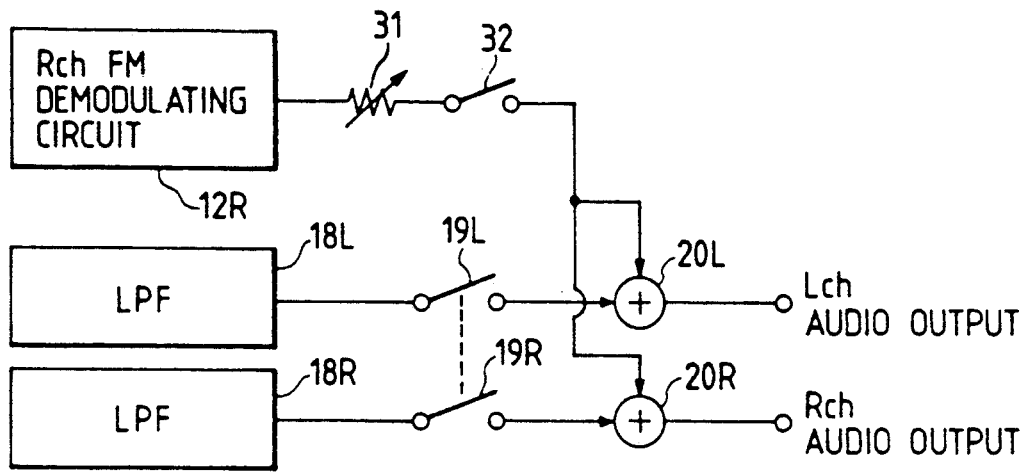
FIG. 4
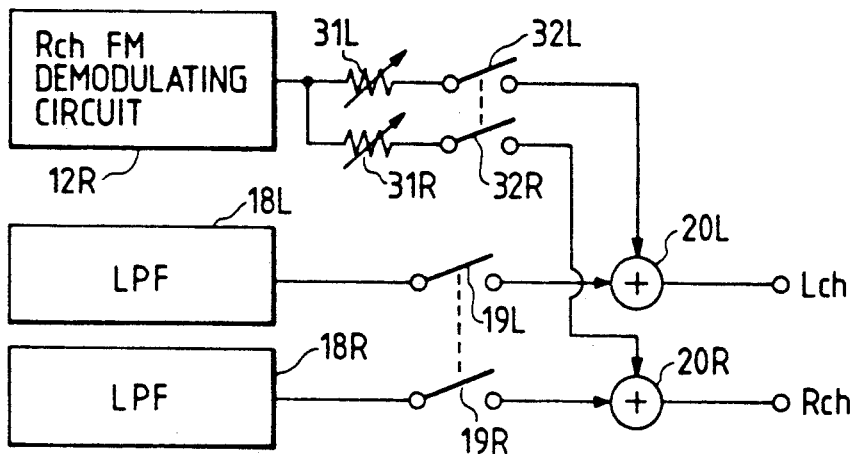
FIG. 5
FIG. 6 Prior Art
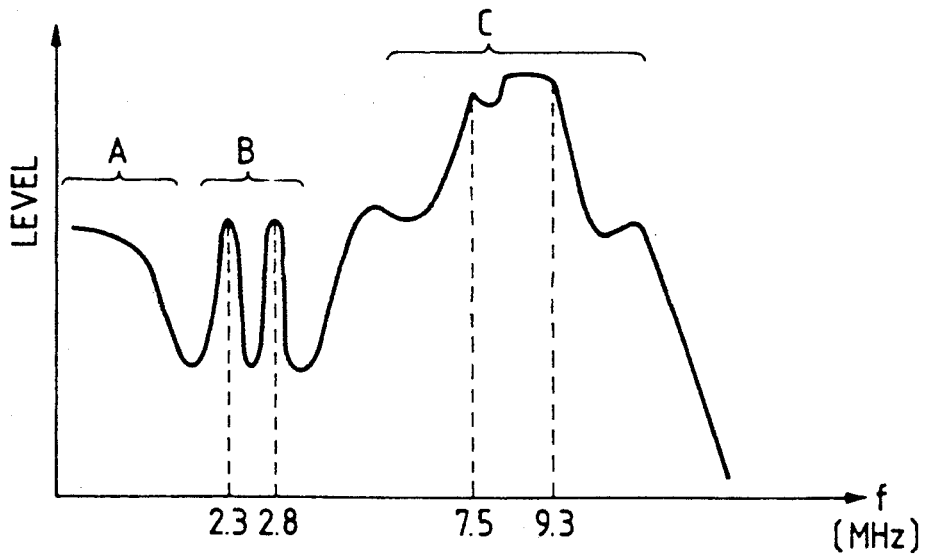

LASER VISION DISC WITH DIGITAL SOUND (LDD) DISC PLAYER FOR REPRODUCING ANALOG AUDIO SIGNALS MIXED WITH DIGITAL AUDIO SIGNALS

This is a continuation of application Ser. No. 07/481,272 filed Feb. 20, 1990, now abandoned.

RELATED CASE

This case is related to U.S. application Ser. No. 07/481,260, filed on Feb. 20, 1990, now U.S. Pat. No. 5,177,728, (and based on Japanese Patent Application No. Hei-1-54200, filed Mar. 7, 1989, and entitled "DISC PLAYER".

FIELD OF THE INVENTION

The present invention relates to a disc player capable of playing a so-called Laser vision Disc with Digital sound (LDD) disc, in which analog audio signals formed of a plurality of channels and digital stereo audio signals, exist in different frequency ranges and are recorded in a predetermined format.

BACKGROUND OF THE INVENTION

An LDD disc is a video disc in which an audio signal is digitized through a predetermined digital modulation approach into a train of pulse signals and is converted into an FM modulated signal for recording together with an FM modulated video signal and an FM modulated analog audio signal.

With the LDD disc, the audio signal is split into two channels where audio carriers of 2.3 MHz and 2.8 MHz, respectively, are frequency modulated by the two-channel audio signals. The video signal is frequency modulated so that a sync tip is at 7.6 MHz, a pedestal level is at 8.1 MHz, and a white peak is at 9.3 MHz, respectively. The audio signal is digitized through, for example, Pulse Code Modulation (PCM) into a train of pulse signals. The pulse train signal is suitable for recording through the Eight-to-Fourteen Modulation (EFM) technique and has frequency components of a train of pulses having widths of 3T–11T, where T represents a bit period of the PCM signal. A pulse of 3T is about 720 KHz and 11T is about 200 KHz, which is the maximum. The pulse train signal is superimposed at a level of less than about 1/10 of that of the main video carrier, and is slice-amplified at levels in the vicinity of zero-crossing points to be converted into a pulse modulated signal for recording.

FIG. 6 shows the frequency spectrum of an RF signal reproduced from the LDD disc of the above-described recording method. Range A represents the spectrum of a digital stereo audio signal, B shows the spectrum of an audio FM signal of the left and right channels, and C shows the spectrum of a video FM signal.

With such LDD discs, particularly so-called KARAOKE (i.e., sing-along) discs, one of the analog audio signals recorded in the two channels contains a monaural accompaniment while the other channel includes the vocal part in addition to the monaural accompaniment. On the other hand, the digital stereo audio signal contains only the stereo accompaniment. Therefore, when one wishes to listen to the vocal part, the conventional disc player suffers from a problem that there is not the same feeling of listening to a live orchestra due to the fact that the accompaniment is reproduced using only the monaural mode of the analog audio signal reproduced from the disc.

SUMMARY OF THE INVENTION

An object of the present invention is to provide a disc player in which the accompaniment can be reproduced in the stereo mode when one wishes to listen to the vocal part of the LDD disc.

A disc player according to the present invention is one capable of playing back an LDD disc in which digital stereo audio signals and analog audio signals (which are associated with the digital audio signals and formed of a plurality of channels) are recorded in different frequency bands in a predetermined format.

The disc player comprises: a pickup for reading signals recorded in the disc loaded at a playback position; first reproduction means for reproducing the digital stereo audio signals from the signal that is read by means of the pickup; second reproduction means for reproducing the analog audio signals from the signal that is read by means of the pickup; identifying mean for identifying whether or not the disc which is loaded at the playback position is an LDD disc; and mixing means for mixing and outputting, when the disc loaded at the playback is identified as being an LDD disc, the stereo audio signals reproduced by the first reproduction means with any one of the audio signals reproduced by the second reproduction means.

BRIEF DESCRIPTION OF THE DRAWINGS

FIGS. 4–5 are diagrams showing, in part, other embodiments of the invention; and FIG. 6 is a diagram for showing the frequency spectrum of the respective signals recorded in an LDD disc.

DETAILED DESCRIPTION OF THE PREFERRED EMBODIMENTS

An embodiment of the present invention will now be described in detail with reference to the drawings.

Figure 1:
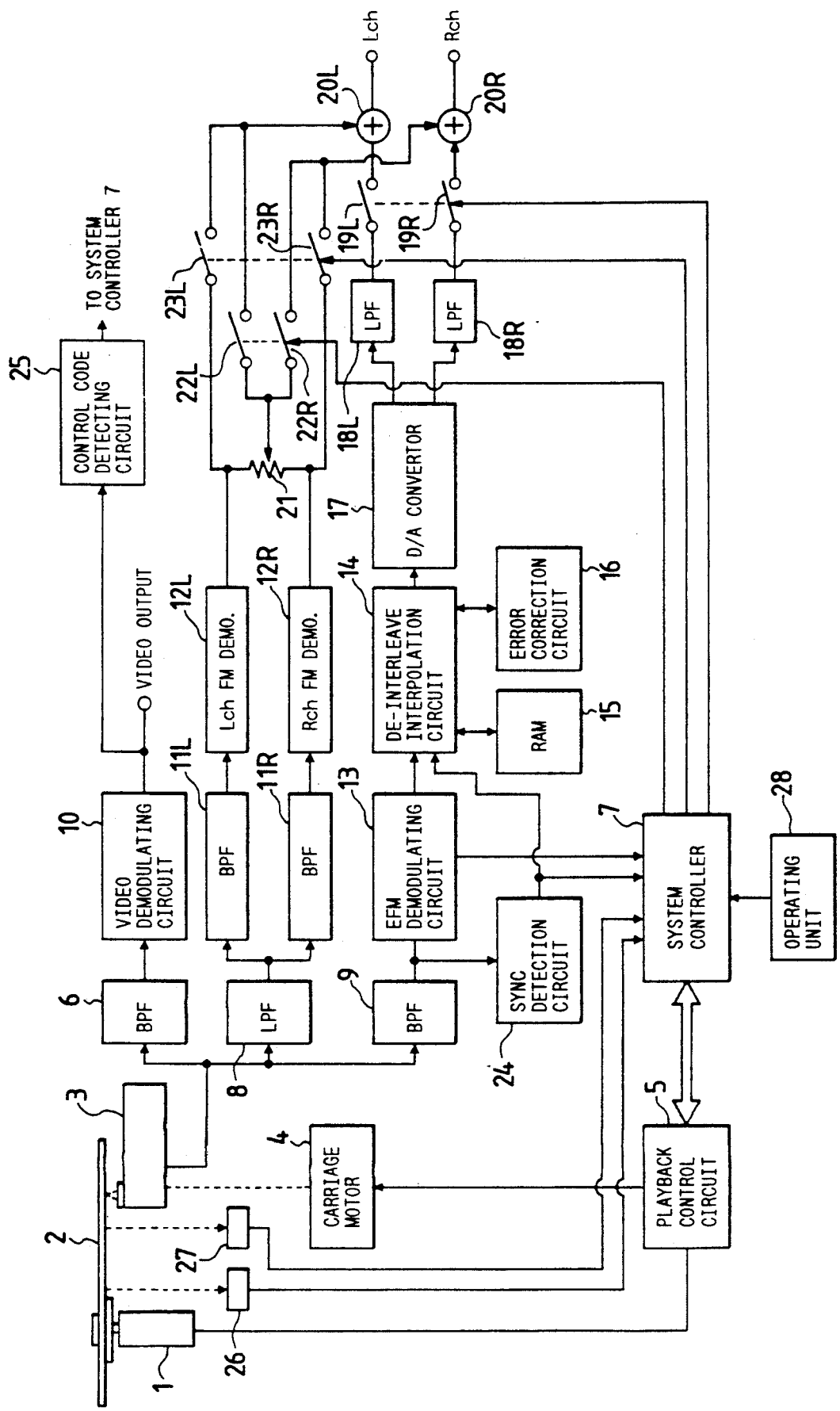
FIG. 1 is a block diagram showing an embodiment of the present invention.

FIG. 1 is a block diagram for showing an example of an optical disc player according to the present invention. A disc 2 is rotated by a spindle motor 1 and the signal recorded on the disc is read out by means of an optical pickup 3. The pickup 3 is supported by a carriage (not shown) which is driven by a carriage motor 4 to move the pickup radially with respect to the disc 2. An information reading portion of the pickup 3 (i.e., an optical spot for reading the information) is positioned radially with respect to disc 2.

In addition to the above-described mechanism, there are provided a variety of servo systems such as a spindle servo system, a focus servo system, a tracking servo system, and a carriage servo system (not shown). These systems are well known and detailed description thereof is omitted.

The spindle motor 1 and the carriage motor 4 are driven by the spindle servo system, the carriage servo system or a playback unit controlling circuit 5. The playback unit controlling circuit 5 is adapted to drive the spindle motor 1 and the carriage motor 4 in accordance with a command from the system controller 7, primarily to perform the on and off control of the aforementioned various servo systems (not shown).

The RF signal outputted from the pickup 3 is supplied to a bandpass filter (BPF) 6 for the video FM, a lowpass filter (LPF) 8 for the analog audio FM and a bandpass filter 9 for the digital audio EFM signal.

The video FM signal passed through the BPF 6 for the video FM is supplied to a video demodulating circuit 10 for demodulating the FM signal to reproduce the video signal.

The output of the LPF 8 is separated into the analog audio FM signals of the left and right channels by BPFs 11L and 11R that pass through only audio carrier components at frequencies of 2.3 MHz and 2.8 MHz, respectively, subsequently to be demodulated into the audio signals of the left and right channels by FM demodulating circuits 12L and 12R. LPF 8, BPFs 11L and 11R, and the FM demodulating circuits 12L and 12R form a first reproducing means.

The digital audio EFM signal, which is separated from the reproduced RF signal by the digital audio EFM signal BPF 9, is supplied to an EFM demodulating circuit 13 and a sync signal detecting circuit 24. The EFM demodulating circuit 13 performs a EFM demodulation process to obtain pulse signals by slicing the RF signal, thereby forming digital data and a subcode including the audio signals of the left and right channels which are the PCM data, i.e., time division multiplexed data. The digital data, including the audio information outputted from the EFM demodulating circuit 13, is supplied to a deinterleave/interpolation circuit 14.

The sync signal detected by a sync signal detecting circuit 24 is supplied to the system controller 7, and as a timing signal to the de-interleave/interpolation circuit 14.

The de-interleave/interpolation circuit 14 is adapted to co-operate with a RAM 15 to put the digital data, which had previously been rearranged in a predetermined order through interleave during recording, back to their original sequence, subsequently to send it to an error correcting circuit 16. Further, the de-interleave/interpolation circuit 14 is adapted to interpolate by, for example, an average value interpolation method, the error data in the output data from the error correcting circuit 16 when a signal indicating that error correction has failed is outputted from the error correcting circuit 16. The error correcting circuit 16 performs the error correction using CIRC (Cross Interleave Reed Solomon Code) to supply the de-interleave/interpolation circuit 14 with serial data, while also outputting a signal indicative that error correction has failed if the data cannot be corrected.

The output of the de-interleave/interpolation circuit 14 is supplied to a D/A (digital-to-analog) conversion circuit 17. The D/A conversion circuit 17 has a de-multiplexer which, for each channel, separates the time division multiplexed digital data containing the audio information of the left and right channels, and reproduces the audio signals of the left and right channels. The reproduced audio signal has unwanted components thereof removed by LPFs (low pass filters) 18L and 18R to become digital audio output. The circuits labeled 9, 13-17, 18L, 18R and 24 form a second reproducing means.

The respective outputs of the LPF 18L and 18R, i.e., the left and right channels, are connected with one of the contacts of the selector switches 19L and 19R and (with a closing of the switches 19L and 19R) can be selectively connected to first input terminals of adders 20L and 20R. A wiper of a variable resistor 21 is connected as a balance adjustment between the respective outputs of the FM demodulating circuits 12L and 12R and is connected to the contacts of the selector switches 22L and 22R and (with a closing of the switches 21L and 21R) can be selectively connected to second input terminals of adders 20L and 20R. The respective output terminals of the FM demodulating circuits 12L and 12R also can be selectively connected directly to the second terminals of adders 20L and 20R via the switches 23L and 23R. The output terminals of the adders 20L and 20R serve as the audio output terminals of the player. The on and off operation of the switches 19L, 19R, 22L, 22R, 23L, and 23R are controlled by the system controller 7.

A subcode outputted from the EFM demodulating circuit 13 is supplied to the system controller 7. The system controller 7 is formed of a microcomputer consisting of, for example, a processor, a ROM, a RAM, and a timer. The system controller 7 performs an arithmetic operation in accordance with the data or programs stored in the ROM and RAM under a command supplied from an operation unit 28 through key a operation, and outputs instructions such as PLAY, SEARCH, JUMP and so on to the playback unit controlling circuit 5.

The reproduced video signal which is outputted from the video demodulating circuit 10, is supplied to a control code detecting circuit 25. The control code detecting circuit 25 detects a control code indicative of a predetermined twochannel monaural recording to generate a detection signal of a high level. The control code is inserted in the blanking period of the vertical sync signal of the video which is recorded through frequency modulation. The control code represents that the content of the analog audio signal of the left channel is only a monaural accompaniment, and the content of the analog audio signals of the right channel includes the monaural accompaniment and the vocal.

There are further provided a first loading sensor 26 for detecting that the disc is loaded at a predetermined playback position and a second loading sensor 27 for detecting whether the loaded disc is of a predetermined size (for example, a diameter greater than 20 cm). The output signals of the loading sensors 26 and 27 are supplied to the system controller 7. The first loading sensor 26 is mounted to face the disc at a location within a radius of 6 cm with respect to the center of the disc, optically to detect the loading of the disc. The second loading sensor 27 is mounted to face the disc at, for example, a location which is 6-10 cm displaced with respect to the center of the disc, optically to detect the loading of the disc.

Figure 2:
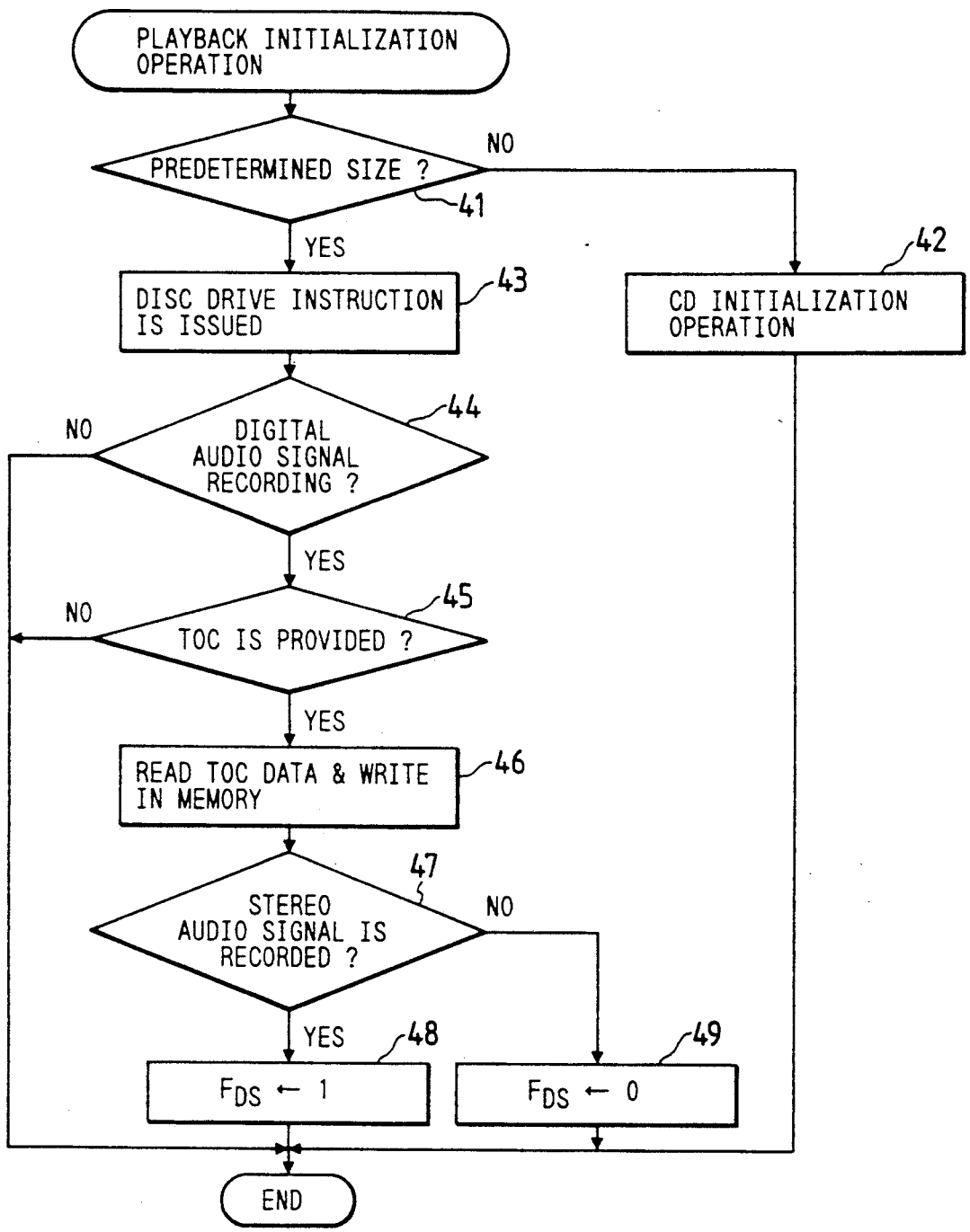
FIGS. 2–3 are flowcharts illustrating the operation of the system controller in the disc player of FIG. 1.

With such an arrangement, when the disc is loaded at a predetermined playback position, the disc detection signal indicative of the loading of the disc is supplied to the system controller 7 from the first loading sensor 26. Then, the processor in the system controller 7 begins an initial operation of playing back the disc to make a decision based on whether or not the disc is of a predetermined size as shown in FIG. 2 (step 41). If the detection signal is not supplied from the second loading sensor 27, then the disc loaded is regarded as being a CD or CDV, and a CD initialization operation is performed (step 42). If the disc is of the predetermined size, then the disc detection signals are supplied from both the first loading sensor 26 and the second loading sensor 27. When the disc is identified as being of the predetermined size, the disc is regarded as being a video disc and the processor issues a instruction to the playback control circuit 5 for initiating the driving of the carriage motor 4 and the spindle motor 1 (step 43), thereby to make a decision based on whether or not a digital audio signal is recorded (step 44). This is decided depending on whether the sync signal is supplied from the sync signal detection circuit 24. If the sync signal is supplied, it is decided that the disc is a video disc or LDD disc in which the digital audio signal is recorded.

Then a decision is made based on whether or not a TOC (Table of Contents) is provided in the inner periphery of the disc (step 45). A TOC is a subcode representative of the tune data such as the required time for playing back the respective tunes, the beginning of the tunes, and the stereo audio signals. If a TOC is not provided, the disc is regarded as being an ordinary video disc in which only an analog audio signal is recorded as an audio signal, even if the digital audio signal is recorded. If a TOC is provided, TOC data is read (step 46) into an internal memory (not shown) to make a decision based on whether or not the digital audio stereo signal is recorded (step 47).

If the digital stereo audio signal is not recorded, a digital stereo flag $F_{DS}$ is reset to 0 (step 49). In the disc in which a monaural digital audio signal is recorded, it is defined that the content of the analog audio signal in the left channel is only the monaural accompaniment and the content of the analog audio signal for the right channel is the monaural accompaniment plus the vocal part.

In the CD initialization operation in step 42, TOC data is read from a TOC in the inner peripheral region of the disc into the internal memory, just as in the LDD disc in which the aforementioned TOC is provided.

Figure 3:
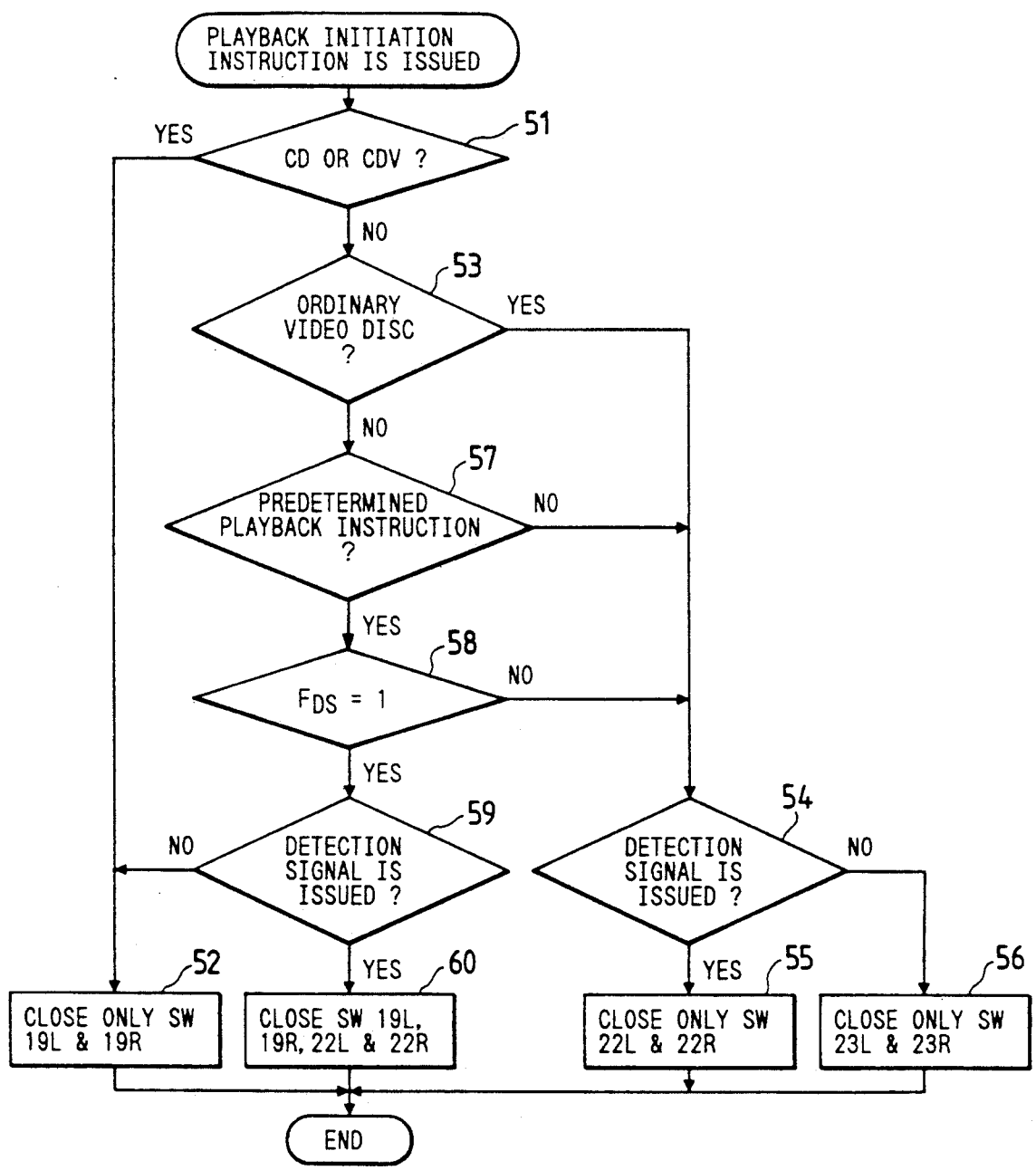

If a playback initialization instruction is issued after the completion of the playback initialization operation of FIG. 2, the processor in the system controller 7 begins a further playback operation as set forth in FIG. 3. Initially, in step 51, a decision is made based on whether or not the CD or CDV is loaded. If the loading of the CD or CDV is confirmed, the switches 19L and 19R are closed and the switches 22L, 22R, 23L and 23R are opened (step 52). In this manner, the audio signal of the left and right channels outputted from the LPF's 18L and 18R are outputted as an output of the player through the switches 19L and 19R and the adders 20L and 20R.

If the CD or the CDV is not loaded, then a decision is made based on whether or not the ordinary video disc (which is not provided with a TOC) is loaded (step 53). If the disc is regarded as being an ordinary video disc, then the system controller 7 makes a decision based on whether or not the detection signal is supplied from the control code detection circuit 25 (step 54).

If the detection signal is supplied, then the content of the analog audio signal in the left channel is only the monaural accompaniment and the content of the analog audio signal in the right channel is the monaural accompaniment plus the vocal part; thus the switches 22L and 22R are closed while the switches 19L, 19R, 23L, and 23R are opened (step 55). By this operation, the audio signals in the left and right channels outputted from the demodulating circuits 12L and 12R are mixed by the variable resistor 21. The mixing ratio in mixing the audio signals in the left and right channels depends on the position of the wiper of the variable resistor 21; thus the sound level of the vocal part contained in the right channel together with the monaural accompaniment as the analog audio signal can be adjusted. The audio signal mixed by the variable resistor 21 is outputted as the output of the player via the switches 22L and 22R and the adders 20L and 20R.

If the detection signal is not supplied, the processor regards the audio signals in the left and right channels outputted from the demodulating circuits 12L and 12R as being the stereo audio signals; thus the processor causes the switches 23L and 23R to close while the switches 19L, 19R, 22L and 22R are open (step 56). Through this operation, the audio signals in the left and right channels outputted from the demodulating circuits 12L and 12R are directly outputted a the outputs of the player, through the switches 23L and 23R and subsequently through the adders 20L and 20R.

If the processor decides that a TOC is provided, then it makes a decision based on whether or not a predetermined playback instruction is issued from the operation unit 28 (step 57). The predetermined playback instruction is issued by means of the key operation through the operation unit 28, to obtain the reproduced sound which includes the vocal part together with the stereo accompaniment thereof. If the predetermined playback instruction is issued, a decision is made based on whether or not the digital stereo flag $F_{DS}$ is set to 1 (step 58).

If $F_{DS} = 1$, a decision is made based on whether or not the detection signal is supplied from the control cod detecting circuit 25 (step 59). If the detection signal is supplied, the disc is decided to be an LDD in which the analog audio signal in the left channel (outputted from the demodulating circuit 12L) contains only the monaural accompaniment and the analog audio signal in the right channel (outputted from the demodulating circuit 12R) contains both the monaural accompaniment and the vocal part, and the switches 19L, 19R, 22L, and 22R are closed and the switches 23L and 23R are opened (step 60). Therefore the stereo audio signals in the left and right channels outputted from the LPF's 18L and 18R are supplied to the adders 20L and 20R through the switches 19L and 19R. On the other hand, the audio signal mixed by the variable resistor 21 are supplied to the adders 20L and 20R through the switches 22L and 22R.

In the adder 20L, the audio signal including the vocal part is added to the audio signal in the left channel of the stereo signals. In the adder 20R, the audio signal including the vocal part is added to the audio signal in the right channel of the stereo signals. The audio signals in the left and right channels thus added by the adders 20L and 20R are outputted as the outputs from the player. Positioning the wiper of the variable resistor 21 to the right channel side can provide the vocal part with the stereo accompaniment.

If the detection signal is not decided as being supplied in step 59, then the playback instruction is ignored and just as in the case of a CD and CDV, the switches 19L and 19R are closed and the switches 22L, 22R, 23L, and 23R are opened (step 52).

If the predetermined playback instruction is not issued in step 57, or if $F_{DS} = 0$ in step 58, then just as in the case of a detected ordinary video disc, the processor proceeds to the step 54 where the system controller 7 makes a decision based on whether o not the detection signal is supplied from the control code detecting circuit 25. If the detection signal is supplied, then the switches 22L and 22R are closed while the switches 19L, 19R, 23L, and 23R are opened (step 55). If the detection signal is not supplied, then the switches 23L and 23R are closed, while the switches 19L, 19R, 22L, and 22R are opened (step 56).

The system controller 7 issues a control signal to the playback control circuit 5 so as to set the disc driving system to a reproduction mode which corresponds to the type of the disc detected, to drive the disc into rotation as well as to control the reading position of the pickup 3.

In the aforementioned embodiment, the signals outputted from the variable resistor 21 are supplied to the adders 20L and 20R through the switches 22L and 22R, but the embodiment is only exemplary. For example, since only the right channel contains both the monaural accompaniment and the vocal part, the output signal from the demodulating circuit 12R, as shown in FIG. 4, may be supplied to the adders 20L and 20R through the switch 32, and then the switch 32 may be closed together with the switches 19L and 19R in step 63. Alternatively, as shown in FIG. 5, the output signal from the demodulating circuit 12R may be supplied to the adders 20L and 20R through the variable resistors 31L and 31R and the switches 32L and 32R.

As described above, the disc player according to the present invention is provided with a first reproduction means for reproducing the digital stereo audio signal in the signal that is read by means of the pickup from the disc loaded at a playback position, and a second reproduction means for reproducing the analog audio signal in the signal that is read by means of the pickup. When the disc loaded at the playback position is identified as being the LDD disc, the stereo audio signal outputted from the first reproduction means is mixed with the analog audio signal outputted from the second reproduction means, and, thereafter, is outputted. In other words, the audio signal, associated with the accompaniment, is the reproduced digital stereo audio signal to which the audio signal associated with the vocal part is added. Thus, when one wishes to listen to the vocal part by playing back the LDD disc, the accompaniment is reproduced in the stereo mode, resulting in sound as good as a live orchestra.

Particularly, when both channels of the analog audio signals are to be mixed with the digital stereo audio signals through the variable resistor 21, only the vocal part that resides in one of the channels is varied, and thus the reproduction of the audio signal can be performed with the output level of the accompaniment remaining constant. The same effect may be obtained by constructing the variable resistors 31L and 31R in FIG. 5 such that they drivingly operate in a manner complementary to each other.

What is claimed is:

1. A disc player capable of playing back recording mediums loaded in the disc player, including a Laser vision Disc with Digital sound (LDD) disc in which video signals, digital stereo audio signals, and analog audio signals formed of a plurality of channels, are recorded in different frequency bands in a predetermined format, wherein said video signals include a control code for initiating a mixing operation, said player comprising:

pickup means for reading signals recorded on a loaded recording medium;

first reproduction means for reproducing a plurality of channels of analog audio signals from signals which are read by said pickup means;

second reproduction means for reproducing digital stereo audio signals from signals which are read by said pickup means;

video reproduction means for reproducing video signals from signals which are read by said pickup means;

identifying means for identifying whether or not the recording medium loaded in the playback position is an LDD disc;

detecting means for detecting the control code from the video signals reproduced by said video reproduction means; and mixing means for automatically mixing, in response to both said identifying means identifying the recording loaded at the playback position as being an LDD disc and also said detecting means detecting the control code from the video signals reproduced by said video reproduction means, at least one of the plurality of channels reproduced by said first reproduction means with said digital stereo audio signals reproduced by said second reproduction means.

2. A disc player as claimed in claim 1, wherein said mixing means comprises adder means for receiving said digital stereo audio signals and said analog audio signals, and adding said analog audio signals to at least one channel of left and right channels of said digital stereo audio signals.

3. A disc player as claimed in claim 2, wherein said second reproduction means produces a first channel containing analog audio signals containing monaural accompaniment and vocal signals and a second channel consisting of analog audio signals containing monaural accompaniment signals but not vocal signals, and said first reproduction means produces a left digital audio signal channel and a right digital audio signal channel which both contain monaural accompaniment signals but not vocal signals.

4. A disc player as claimed in claim 3, wherein said mixing means mixes, when the recording medium loaded at the playback position is identified as being an LDD disc, said first analog audio signal channel with at least one channel of said left and right digital audio signal channels.

5. A disc player as claimed in claim 3, further comprising:

balance means for receiving said first and second analog audio signal channels and providing at least one selectable-balance analog audio output with respect thereto, wherein said mixing means mixes, when the recording medium loaded at the playback position is identified as an LDD disc, said at least one selectable-balance analog audio output with at least one channel of said left and right digital audio signal channels.

6. A method of playing back a Laser vision Disc with Digital sound (LDD) disc, said LDD disc having recorded thereon video signals, digital stereo audio signals, and analog audio signals formed of a plurality of channels, which are recorded in different frequency bands in a predetermined format and reproduced when an LDD disc is loaded in a disc player, wherein said video signals have a predetermined format which includes a control code for initiating a mixing operation, said method comprising the steps of:

judging whether or not a disc loaded in the player is a video disc;

judging whether or not a digital audio signal is recorded on said loaded disc;

judging whether or not a TOC (Table of Contents) is provided on said loaded disc;

identifying said loaded disc as one of a plurality of different kinds of discs including an LDD disc, according to the above judging steps;

detecting the control code from said reproduced video signals; and mixing and outputting, in response to both a judgement that said loaded disc is an LDD disc and also a judgement that a control code is detected, said digital stereo audio signals with at least one of a plurality of channels of analog audio signals recorded on the LDD disc.

7. The method of playing back a LDD disc as claimed in claim 6, wherein the control code indicates that said analog audio signals of the loaded LDD disc have a predetermined format in which a first channel contains monaural accompaniment and vocal signals and a second channel contains monaural accompaniment signals but not vocal signals.

8. A reproduction circuit for use in reproducing information signals recorded on a recording medium, wherein said information signals include a control code for initiating a mixing operation, the reproduction circuit comprising:

a first accompaniment demodulator for demodulating said information signals and producing a first analog accompaniment output;

a second accompaniment demodulator for demodulating said information signals and producing a second analog accompaniment output;

a digital stereo audio signal demodulator for demodulating said information signals and producing first and second digital accompaniment outputs;

a system controller selectively coupling the first accompaniment output from said first accompaniment demodulator and the accompaniment output from said second accompaniment demodulator to first and second output summing circuits, respectively, said system controller further selectively coupling the first and second digital accompaniment outputs to the first and second output summing circuits respectively;

a control code detector for detecting the control code from said information signals; and a balance adjustor, coupled to said accompaniment and said first and second accompaniment demodulators, for combining the outputs from said first accompaniment demodulator and said second accompaniment demodulator, and for selectively coupling at least a portion of the resultant combination to one of the first and second summing circuits, wherein during reproduction of the recording medium, the first and second summing circuits output at least the first analog accompaniment output mixed together with the digital accompaniment outputs in response to detection of the control code by said control code detector.

9. The reproduction circuit as claimed in claim 8, wherein the recording medium is a laser vision disc with digital sound that has a program recorded thereon including digital stereo audio signals of the accompaniment portion of the program, analog audio signals of the accompaniment portion, as well as, of the vocal and the accompaniment portions of the program, and video signals of the program.

10. The reproduction circuit as claimed in claim 8, wherein said information signals include analog audio signals in which a predetermined format exists whenever said information signals include the control code, wherein said predetermined format comprises the first channel which contains monaural accompaniment and vocal signals and a second channel which contains monaural accompaniment signals but not vocal signals, and wherein said information signals further include digital stereo audio signals which contain digital stereo accompaniment signals.

* * * * *